Figure 1:
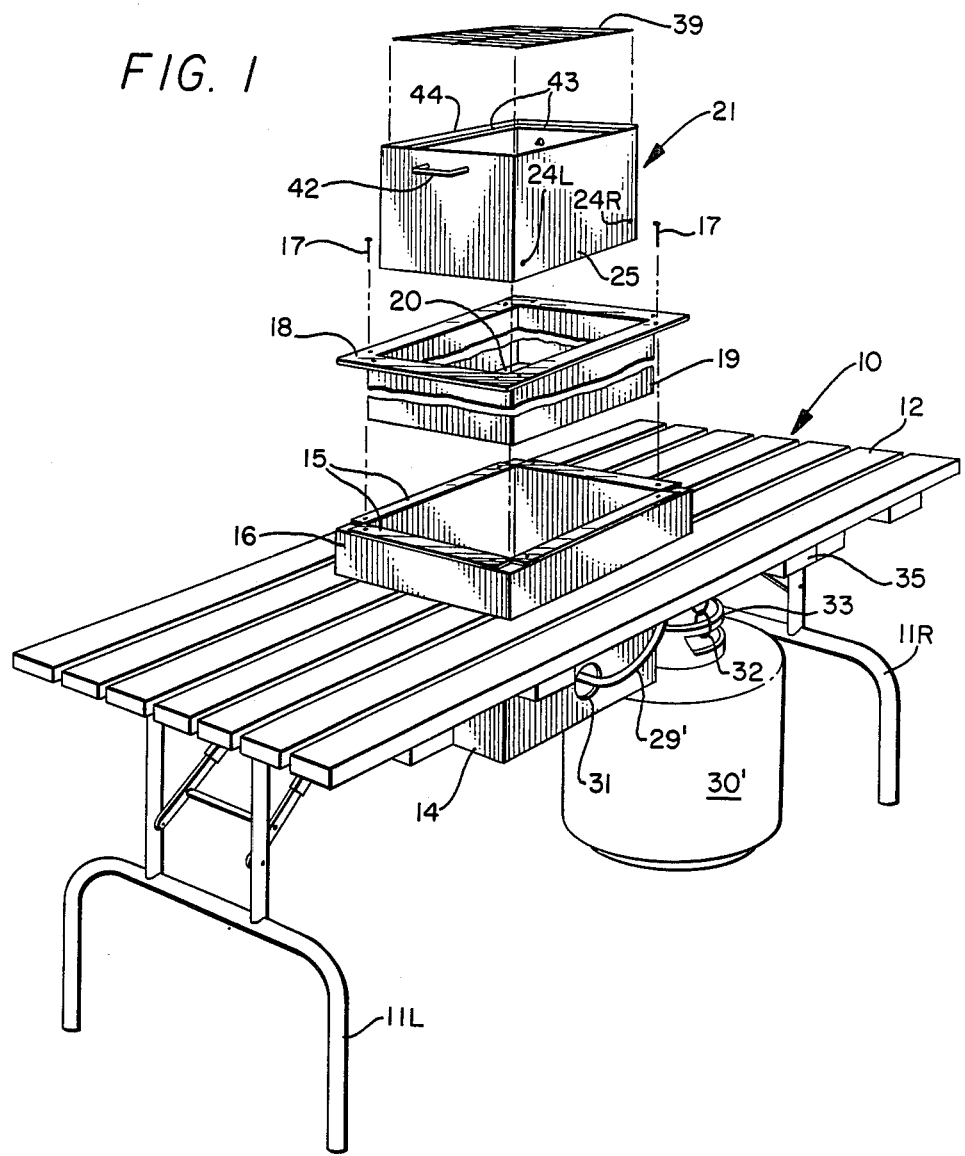

United States Patent [19]

Segroves

[11] Patent Number: 4,759,276
[45] Date of Patent: Jul. 26, 1988

[54] FOLD UP LEG BARBEQUE CONVERSION FROM FREE STANDING TO TABLE DEEP FRY INSERTION

[76] Inventor: James L. Segroves, 3025 Chisholm Trail, Garland, Tex. 75042

[21] Appl. No.: 5,218

[22] Filed: Jan. 20, 1987

[51] Int. Cl.⁴ .......................... A47J 37/07; F24C 3/14
[52] U.S. Cl. ........................................ 99/339; 99/340; 99/357; 99/449; 126/25 R; 126/39 R
[58] Field of Search ................. 99/339, 340, 357, 419, 99/426, 447, 449; 126/39 J, 39 K, 39 M, 40, 59, 65, 304 R–306, 25 R, 39 R

[56] References Cited

U.S. PATENT DOCUMENTS

| | | | |
|---|---|---|---|
| 2,247,612 | 7/1941 | Haislip | 126/304 X |
| 2,667,392 | 1/1954 | Sexton | 126/304 X |
| 2,780,474 | 2/1957 | Farah et al. | 126/304 A X |
| 3,477,360 | 11/1969 | Raney | 99/339 |
| 4,086,849 | 5/1978 | Simmons | 99/357 |
| 4,089,258 | 5/1978 | Berger | 126/39 J |
| 4,442,762 | 4/1984 | Beller | 99/340 X |
| 4,587,948 | 5/1986 | Haglund | 99/449 X |

FOREIGN PATENT DOCUMENTS 102624 8/1981 Japan ................... 126/305

Primary Examiner—Donald Watkins
Attorney, Agent, or Firm—Warren H. Kintzinger

[57] ABSTRACT

A portable barbeque module having an outer shell, cooking grid, lava rock brickettes, a grill, a perforated plate or woven wire grate holding the brickettes and equipped with a heat distributing baffle, handles and folding legs. With the legs folded up the barbeque is insertable as an instant converter for converting LP gas deep fat fish frying units with the deep fat fry pan removed to a barbeque cooker.

12 Claims, 3 Drawing Sheets

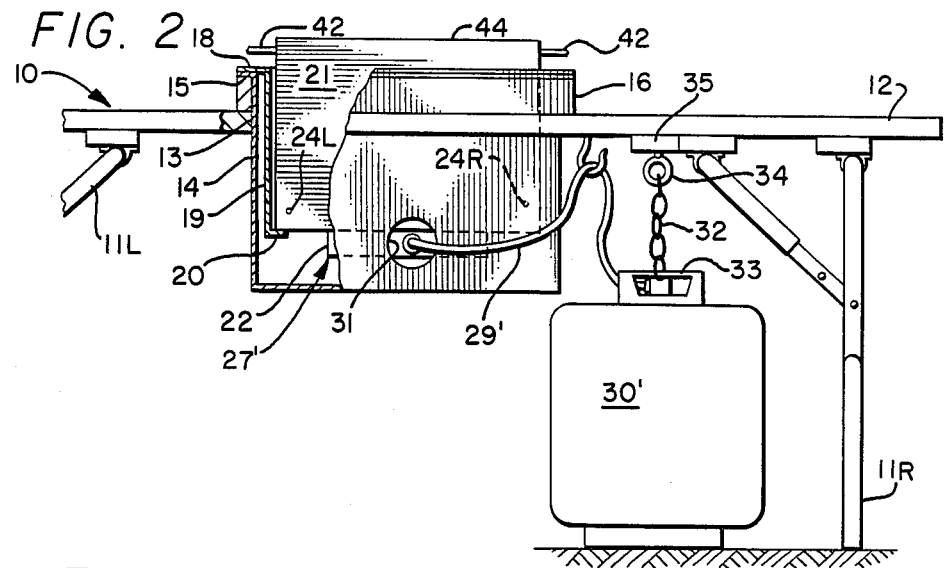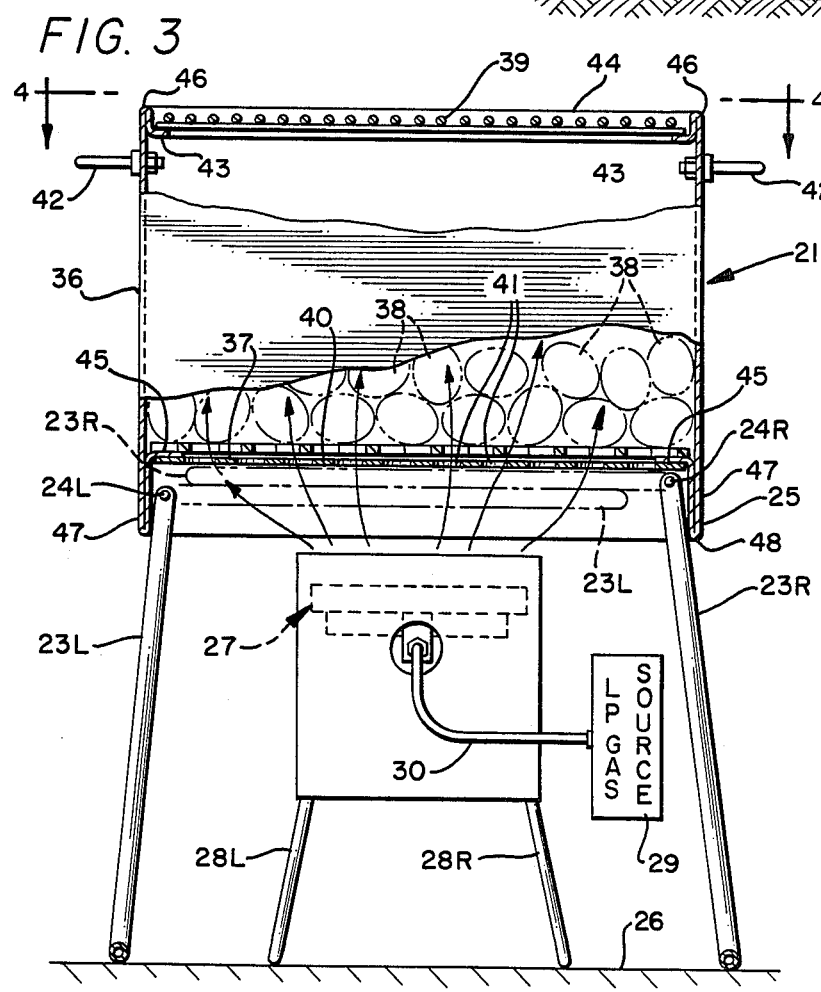

FOLD UP LEG BARBEQUE CONVERSION FROM FREE STANDING TO TABLE DEEP FRY INSERTION

This invention relates in general to outdoor cooking devices, and more particularly, to a portable barbeque unit having fold up legs useable in a free standing state over a LP burner and with the legs folded up insertable as a barbecue cooker converter for LP gas deep fat frying units with the deep fat fry pan removed.

Outdoor barbeque cookers have been used for years in the back yard and at the camp site for preparing tasty esthetically appealing food and there is an extensive market for cooking equipment particularly designed for such use. A portable barbeque cooker that is useable in the free standing state and with legs folded up insertable as a barbeque cooker conversion for LP gas deep fat fish frying units replacing the deep fat fry pan in such units both table type and leg mounted units is needed for the public.

It is therefore a principal object of this invention to provide a barbeque cooker convertable from a free standing state to a deep fat fish frying unit barbeque insertion conversion.

Another object is to provide such a barbeque unit that is both portable and safer in use than many other cookers presently in use.

A further object is to provide such a barbeque unit with fold up legs that provide sturdy support in the unfolded support state and that fold up into the bottom of the cooker for carrying the unit and for insertion in deep fat fish frying cookers with the deep fat fry pan removed.

Features of the invention useful in accomplishing the above objects include, in a barbeque cooker with fold up legs, a barbeque cooker convertable from the free standing state to use inserted, with the legs folded up, in a LP gas deep fat fish frying unit with the deep fat fry pan removed. It is a portable barbeque cooker having an outer metal shell, a cooking grid wire grate or perforated plate supporting lava rock brickettes, a grill, a heat distributing baffle mounted on or as a part of the grid wire grate or perforated plate and handles. The barbeque cooker has fold up legs that fold up to within a bottom skirt extension of the outer metal shell extending below the grate of the cooker for transporting the cooker in the portable state or insertion as an instant converter for converting LP gas deep fat frying units with the deep fat fry pan removed to a barbeque cooker.

A specific embodiment representing what is presently regarded as the best mode of carrying out the invention is illustrated in the accompanying drawings.

Figure 4:
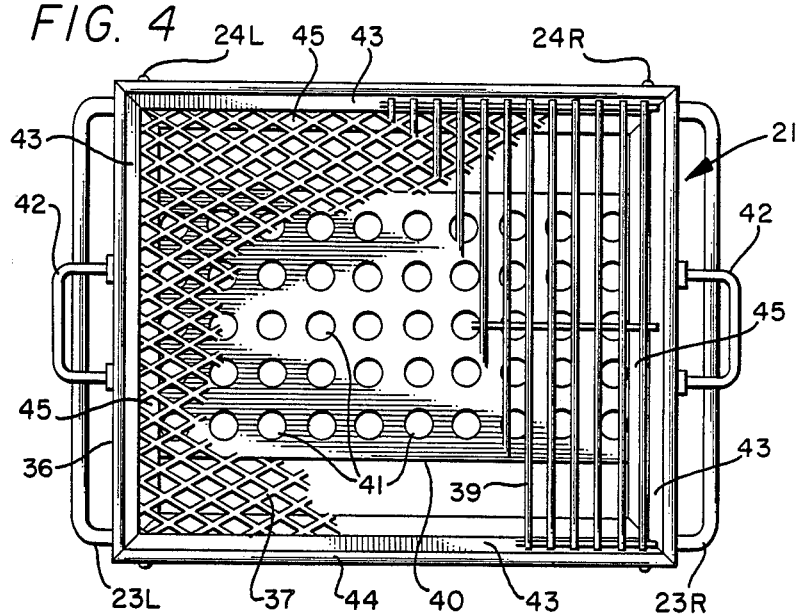
Figure 5:
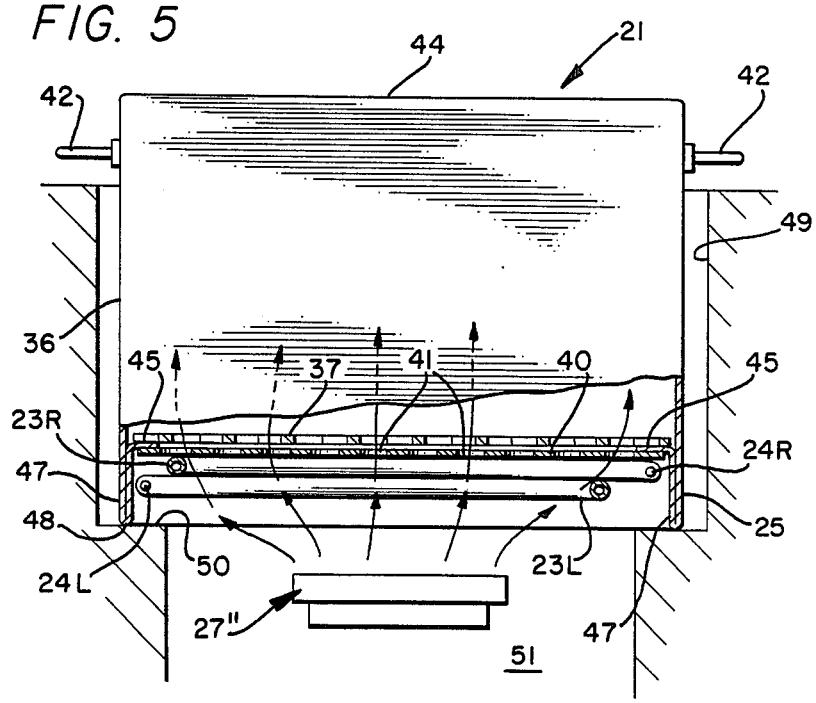

In the drawing:

FIG. 1 represents a perspective view of a picnic table equipped with a deep fat frying cooker box into which the exploded out barbeque cooker conversion unit shown is insertable;

FIG. 2, a partially broken away and sectioned side view of the picnic table with the barbeque cooker conversion unit inserted in the table cooker box and the propane gas bottle fuel source for the cooker;

FIG. 3, a partially broken away and sectioned side elevation view of the portable barbeque cooker in the free standing state with the legs folded down and a gas burner below the cooker;

FIG. 4, a top plan view of the barbeque cooker conversion unit; and,

FIG. 5, a side elevation view of the barbeque cooker conversion unit with the legs folded up and the unit inserted in a cooking pit.

Referring to the drawings:

The picnic table 10 of FIGS. 1 and 2 are shown to be equipped with opposite end support leg assemblies 11L and 11R that support table top 12 above the ground. A rectangular opening 13 is provided in the table top 12 through which a cooker box 14 extends. The cooker box 14 is formed from sheet metal with outwardly extended flanges 15 that overlap the top of a rectangular frame 16 of and fastened thereto as by screws 17. The screws 17 also extend through flanges 18 of metal heat shield 19 that extends down into box 14 and that is provided with inwardly directed mounting flanges 20 upon which a barbeque cooker 21 rests when it is inserted into cooker box 14. In the alternative barbeque cooker 21 could be supported by a cooking grill (detail not shown) above the gas burner 22 that otherwise supports a deep fat fry pot that is removed for insertion of barbeque cooker 21 for the barbeque conversion.

Referring also to FIGS. 3, 4 and 5 the barbeque cooker 21 is equipped with opposite end support leg assemblies 23L and 23R that are pivot pin 24L and 24R mounted inside skirt portion 25 of the barbeque cooker 21 in order that they may be folded up in overlapping relation as shown in FIG. 5 and in phantom in FIG. 3. It should be noted that support leg assembly 23R is as much longer than support leg assembly 23L as the pivot pin 24R is higher than pivot pin 24L in mounting the respective support leg assemblies 24R and 24L. Thus, the barbeque cooker 21 may be used as a free standing barbeque cooker 21 with the support leg assemblies 23L and 23R unfolded to support the cooker 21 on a surface 26 above a gas burner 27 also supported by legs 28L and 28R on the surface 26. A gas supply such as an LP gas source 29 provides gas through line 30 to gas burner 27.

With the table barbeque cooker 21 conversion of FIGS. 1 and 2 the gas burner 27' is supported in a burner box 14 below the table top 12 provided with a side inlet air opening 31 that also serves for passage of propane gas line 29' therethrough in connecting the propane bottle 30' to burner 27'. The propane bottle 30' is mounted with a chain 32 connected from top handle 33 to an eye bolt 34 fastened to a beam or block of wood 35 fastened to the bottom of the tabel top 12.

In any event in whatever conversion the barbeque conversion unit 21 has an outer metal shell 36, a cooking grid wire grate 37 (or perforated plate) supporting lave rock brickettes 38, a top grill 39 and heat distributing baffle 40 with distributed openings 41 mounted as by welding on or as a part of the grid wire grate 37 and handles 42. The top grill 39 is supported by flanges 43 recessed from the top 44 of the barbeque cooker 21 that is also provided with a lower internal flange 45 at the top of skirt portion 25. The flanges 43 are extensions of folded over portions 46 of the shell 36 forming the top 44 and extending down to and into flanges 43 to, in addition to providing flanges 43 mounting top grill 39, provide reinfocing structural strength and stiffness to the top of the barbeque cooker 21. The lower internal flanges 45 are extensions of folded over portions 47 of the shell 36 forming the bottom rim 48 of the cooker and extending up to and into flanges 45. It should be noted that the support leg assemblies 23L and 23R are "U" shaped legs such that when folded up within skirt 25 room is provided that a burner can extend up to well within the enclosed space within skirt 25 and within the profile projection of the folded up "U" shaped legs 23L and 23R.

With the barbeque cooker 21 conversion installation of FIG. 5 the cooker 21 is lowered into a cooking pit 49 with folded over reinforced bottom rim 48 resting on pit shoulder 50 with the cooker 21 above a burner 27" contained in cooking pit bottom extension 51.

Whereas this invention has been described with respect to a single embodiment thereof in several use conversions, it should be realized that various changes may be made without departure from the essential contributions to the art made by the teachings hereof.

I claim:

1. A portable barbeque module comprising: an outer rectangular shell having an open top rim and an open bottom rim; upper internal flange means holding a grill; lower internal flange means holding grate means; a bottom skirt portion extending from said lower internal flange means down to said open bottom rim; opposite end first and second leg means pivotally mounted in said bottom skirt portion and foldable between a down free standing state ro a folded up state with said first and second leg means entirely contained within said bottom skirt portion; wherein said grill is a transverse rod grill for supporting food being barbeque grilled at the top of the barbeque cooker; said grate means is an expanded metal open mesh grate; and wherein a heat distributing baffle with multiple distributed openings is mounted on said grate.

2. The portable barbeque module of claim 1, wherein said bottom skirt portion is an increased thickness wall portion extending from said lower internal flange means down to said open bottom rim.

3. The portable barbeque module of claim 2, wherein said leg means pivotally mounted in said bottom skirt portion are mounted with multiple pivot pin means extended, respectively, through the tops of said opposite end first and second leg means and through adjacent portions of the increased thickness wall portion in said bottom skirt.

4. The portable barbeque module of claim 3, wherein said first and second leg means overlie each other when in the folded up state.

5. The portable barbeque module of claim 4, wherein the pivot pin mounting of one of said first and second leg means is higher in the skirt portion than the pivot pin mounting of the other of said first and second leg means.

6. The portable barbeque module of claim 5, wherein the support leg assembly of one of said first and second leg means is substantially as much longer than the other of first and second leg means as the pivot pin mounting of one of said first and second leg means is higher in the skirt portion than the pivot pin mounting of the other of said first and second leg means.

7. The portable barbeque module of claim 5, wherein each of said first and second leg means is a "U" shaped structure pivotally mounted at each side top to the respective side of the skirt portion; with the transverse bottom of the "U" shape that rests on a supporting surface in the folded down state is of such transverse length that said first and second leg means nest within the respective portions of said "U" shaped leg means being closely adjacent respective internal walls of said skirt portion.

8. The portable barbeque module of claim 7 wherein when said "U" shaped first and second leg means are in the folded up state within the skirt portion of said portable barbeque module said grate means held by said lower internal flange means is exposed to flame and heat emanating from a burner positioned there beneath throughout most of its area out to the outer fringe areas thereof except for some overlie by said "U" shaped leg means around the edges when in the folded up state.

9. The portable barbeque module of claim 3, wherein said increased thickness wall portion in said bottom skirt is formed with folded over portions of said outer rectangular shell forming said open bottom rim and extending up to and into said lower internal flange means.

10. The portable barbeque module of claim 9, wherein said outer rectangular shell is formed with top folded over portions forming said open top rim and extending down to and into said upper flange means.

11. The portable barbeque module of claim 1 wherein a heat holding and distributing media substance is supported on said heat distributing baffle.

12. The portable barbeque module of claim 11, wherein the heat holding and distributing media substance is lava rock brickettes.

* * * * *